(12) United States Patent
Hethcock et al.

(10) Patent No.: US 8,214,981 B2
(45) Date of Patent: Jul. 10, 2012

(54) METHOD AND APPARATUS FOR Z-DIRECTION REINFORCEMENT OF COMPOSITE LAMINATES

(75) Inventors: Donn J. Hethcock, Colleyville, TX (US); Scott J. Drennan, Dallas, TX (US); Ken D. Cominsky, Mansfield, TX (US)

(73) Assignee: Bell Helicopter Textron Inc., Fort Worth, TX (US)

( * ) Notice: Subject to any disclaimer, the term of this patent is extended or adjusted under 35 U.S.C. 154(b) by 0 days.

(21) Appl. No.: 13/195,129

(22) Filed: Aug. 1, 2011

(65) Prior Publication Data

US 2011/0277937 A1 Nov. 17, 2011

Related U.S. Application Data

(63) Continuation of application No. 10/533,427, filed as application No. PCT/US03/34946 on Nov. 3, 2003, now Pat. No. 7,993,477.

(60) Provisional application No. 60/423,641, filed on Nov. 1, 2002.

(51) Int. Cl.
*D04H 18/00* (2012.01)
(52) U.S. Cl. ............................ 28/107; 28/112
(58) Field of Classification Search ............ 28/107–115, 28/103, 165, 169; 156/148, 245, 423, 91, 156/92, 72; 428/86, 96
See application file for complete search history.

(56) References Cited

U.S. PATENT DOCUMENTS

| | | | |
|---|---|---|---|
| 3,199,166 A * | 8/1965 | Petersik | 28/107 |
| 3,247,816 A * | 4/1966 | Polevitzky | 112/80.17 |
| 3,473,205 A * | 10/1969 | Zocher | 28/107 |
| 3,476,626 A * | 11/1969 | Charlton, Jr. et al. | 156/148 |
| 3,538,564 A * | 11/1970 | Skoler et al. | 28/109 |
| 3,657,061 A | 4/1972 | Carlson et al. | |
| 3,725,984 A * | 4/1973 | Graber | 28/107 |
| 4,837,065 A | 6/1989 | Dow | |
| 4,888,228 A | 12/1989 | Sidles | |
| 5,143,569 A | 9/1992 | Gotoh et al. | |
| 5,271,982 A | 12/1993 | Verpoest et al. | |
| 5,504,979 A * | 4/1996 | Sheehan et al. | 28/113 |
| 5,642,679 A | 7/1997 | Monget et al. | |
| 5,802,682 A * | 9/1998 | Jourde et al. | 28/107 |
| 5,858,890 A | 1/1999 | Sheehan et al. | |
| 5,879,492 A | 3/1999 | Reis et al. | |
| 5,935,698 A | 8/1999 | Pannell | |
| 6,105,223 A * | 8/2000 | Brown et al. | 28/111 |
| 6,360,412 B1 | 3/2002 | Duval et al. | |

(Continued)

FOREIGN PATENT DOCUMENTS

WO 9919137 A1 4/1999

(Continued)

OTHER PUBLICATIONS

First Canadian Office Action from CA counterpart Application No. 2,496,817, issued by the CA Patent Office on Feb. 25, 2009.

(Continued)

*Primary Examiner* — Amy Vanatta
(74) *Attorney, Agent, or Firm* — James E. Walton; Richard G. Eldredge (57) ABSTRACT

A method and apparatus for Z-direction reinforcement of composite laminates is disclosed. Discrete fibers are pulled through a fiber composite preform in the Z-direction by barbed needles.

10 Claims, 11 Drawing Sheets

U.S. PATENT DOCUMENTS

| | | | | |
|---|---|---|---|---|
| 6,405,417 | B1 * | 6/2002 | Sheehan et al. | 28/107 |
| 6,622,359 | B2 * | 9/2003 | Legl | 28/114 |
| 6,767,602 | B1 * | 7/2004 | Duval et al. | 428/36.1 |
| 2010/0037441 | A1 * | 2/2010 | Lescostaouec | 28/107 |

FOREIGN PATENT DOCUMENTS

| | | |
|---|---|---|
| WO | 0192002 A2 | 12/2001 |

OTHER PUBLICATIONS

Amendment filed on Aug. 24, 2009 in response to Canadian Office Action dated Feb. 25, 2009.
Second Canadian Office Action from CA counterpart Application No. 2,496,817, issued by the CA Patent Office on Apr. 21, 2010.
Amendment filed on May 28, 2010 in response to Canadian Office Action dated Apr. 21, 2010.
First European Office Action from EP counterpart Application No. 03768579.9, issued by the EP Patent Office on Jul. 3, 2007.
Amendment filed on Mar. 24, 2007 in response to European Office Action dated Jul. 3, 2007.
Second European Office Action from EP counterpart Application No. 03768579.9, issued by the EP Patent Office on Aug. 30, 2007.
Amendment filed on Feb. 19, 2008 in response to European Office Action dated Aug. 30, 2007.
International Written Opinion from counterpart Application No. PCT/US03/34946 issued Jul. 12, 2004.
Response filed Jul. 13, 2004 in response to the International Written Opinion dated Jul. 12, 2004.
International Preliminary Examination Report from counterpart Application No. PCT/US03/34946 issued Dec. 21, 2004.
First Chinese Office Action from counterpart CN Application No. 200380101844, 2006.
Second Chinese Office Action from counterpart CN Application No. 200380101844.

* cited by examiner

METHOD AND APPARATUS FOR Z-DIRECTION REINFORCEMENT OF COMPOSITE LAMINATES

CROSS REFERENCE TO RELATED APPLICATIONS

This application is a continuation of U.S. application Ser. No. 10/533,427, filed 17 Jan. 2006, titled "Method and Apparatus for Z-Direction Fiber Insertion of Discrete Fibers for Reinforcement of Composite Laminates," which claims the benefit of International PCT Application No. PCT/US03/34946, filed 3 Nov. 2003, titled "Method and Apparatus for Z-Direction Reinforcement of Composite Laminates," which claims the benefit of Provisional Application No. 60/423,641, filed 1 Nov. 2002, titled "Needled Fabric," all of which are hereby incorporated by reference for all purposes as if fully set forth herein.

BACKGROUND

1. Field of the Present Description

The present invention relates to the reinforcement of composite laminates and composite laminate bonded joints. In particular, the present invention relates to Z-direction reinforcement of laminated fiber preforms and laminated fiber preform bonded joints.

2. Description of Related Art

An unmanned aerial vehicle (UAV) is defined as a powered, aerial vehicle that has does not carry a human operator, flies autonomously or is piloted remotely, and is expendable or recoverable. When control is exercised by a remote pilot, control may be continuous or episodic. However, autonomous vehicles may follow preprogrammed courses and may or may not have the capacity for rerouting or re-targeting.

Fiber composite laminates are formed by building up multiple layers of composite fibers one upon another. Each layer of fibers is oriented in a specific direction to provide particular properties to the laminate. In a typical laminate, some fibers extend parallel to the longitudinal axis, others extend transverse to the longitudinal axis, and others extend "off-axis" at various angles to the longitudinal axis. By laying up and orienting the fiber layers in certain configurations, the stiffness and other properties of the laminate can be predetermined. A "preform" is a dry fiber composite laminate. Often these preforms are "tackified," i.e., treated with a material that binds the fibers together, so that the preforms can be more easily handled, shaped, worked, and laid up until the resin is introduced into the preform.

The composite fibers provide strength to the laminate in the plane of the material, but the only material perpendicular to that plane (the Z direction) is the resin. Thus, interlaminar delamination is a common form of failure in fiber composite laminates. Reinforcement of fiber composite laminates in the Z-direction is one way to prevent propagation of delaminations. However, Z-direction reinforcement often creates modifications, alterations, and disruptions to the basic structure of the laminate and generally weakens and softens the laminate. This reduction in strength of the laminate is commonly referred to as "knockdown." There are several methods of providing Z-direction reinforcement, including Z-pinning, stitching, 3-dimensional weaving, and needling.

Z-pinning is a process by which rigid pins are forced through a prepreg laminate, which is a laminate pre-impregnated with resin. The rigid pins are inserted into a thin piece of foam. The foam is then placed on top of the prepreg. Next, the pins are forced through the composite fibers in the prepreg. An ultrasonic horn is typically used to vibrate the pins through the prepreg.

There are several problems with Z-pinning. Working with prepreg material requires specialized storage and handling, which is expensive and labor intensive. Second, the insertion process breaks some composite fibers. Broken fibers reduce the integrity of the basic laminate. Third, because the prepreg is partially cured with resin, there is less void space between the fibers to accept the pins. This results in undesirable deformation of the fibers.

In stitching, the layers of the fiber preform are mechanically sewn together. The needle punctures through the preform from one side, and the stitching thread is caught by a similar stitching material as it exits on the other side of the preform. In some instances, random mat of chopped fibers are used as layers within the stitched perform laminate. The chopped fibers are not pulled back through the layers of the preform by the needles.

There are several drawbacks to the stitching method. In stitching, the dry composite fibers must be held in tension over platens in large machines. The stitching method requires machine components on both sides of the preform. Furthermore, with the stitching method, the stitching material is tightly woven around the composite fibers, leaving no way to join one laminate to another with Z-direction bondline reinforcement.

In 3-dimensional weaving, Z-direction reinforcement is provided by interweaving reinforcement fibers in the Z direction with the fibers in the X and Y directions. Although this method provides straight fibers in three directions, it is very difficult to incorporate 45° fibers, and other off-axis fibers, into the weave. Also, in 3-dimensional weaving, as with the stitching method, the stitching material is tightly woven around the composite fibers, leaving no way to join one laminate to another with Z-direction bondline reinforcement.

In the needling method, the fibers of the preform laminate that extend in the X and Y directions are chopped into small pieces by barbed needles. This results in a tangled mass of chopped fibers, including fibers in the Z direction. The drawbacks associated with fiber chopping are obvious. Although fiber chopping does produce some fibers in the Z direction, the fibers in the X and Y directions are cut, and any predefined properties of the preform in the X and Y directions are significantly depleted.

DESCRIPTION OF THE DRAWINGS

The novel features believed characteristic of the invention are set forth in the appended claims. However, the invention itself, as well as, a preferred mode of use, and further objectives and advantages thereof, will best be understood by reference to the following detailed description when read in conjunction with the accompanying drawings, wherein:

DETAILED DESCRIPTION

The present invention improves the interlaminar performance of fiber composite laminate preforms by adding through-thickness Z-direction fibers. These Z-direction fibers are introduced into the dry preform using a process referred to herein as "fiber insertion," in which straight barbed needles are inserted into the preform in the Z direction. A mat of discrete fibers is placed on the preform. As the needles pass through the mat of discrete fibers, the barbs catch and fill up with some of the discrete fibers. As the needles are forced through the layers of the preform, the discrete fibers are pulled through the preform by the barbs. As the needles retract back through the preform, the discrete fibers are released by the barbs and left in the perform as Z-direction reinforcement fibers.

Figure 1:
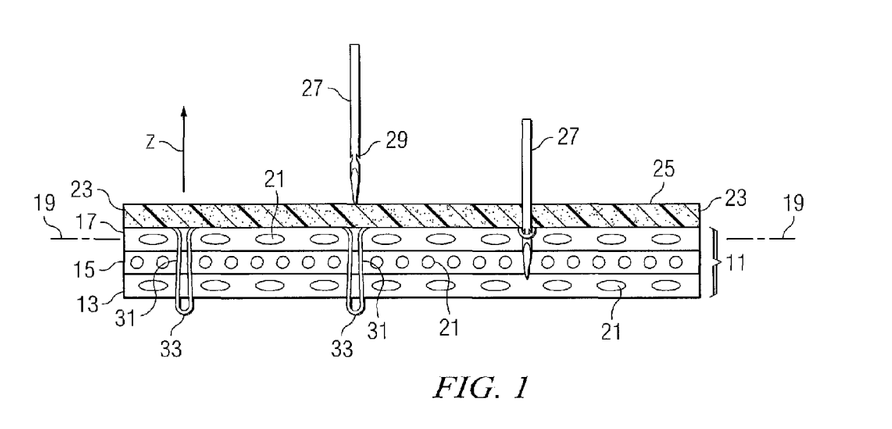
FIG. 1 is a schematic showing the method and apparatus for Z-direction reinforcement of composite laminates according to the present invention.

Referring to FIG. 1 in the drawings, a schematic of the method and apparatus for reinforcing composite laminates according to the present invention is illustrated. A fiber composite laminate preform 11 includes a plurality of layers 13, 15, and 17 of composite fibers. As is well known in the art, layers 13, 15, and 17 may be oriented in different directions relative to a longitudinal axis 19 of preform 11. Each layer 13, 15, and 17 is comprised of a plurality of individual aligned composite fibers 21, such as carbon fibers. In the preferred embodiment, preform 11 is a stitched preform, in which conventional stitching 16 (see FIGS. 11A and 11B) holds the individual fibers 21 and layers 13, 15, and 17 together.

In accordance with the present invention, a layer or mat 23 of a plurality of individual discrete fibers 25 is disposed on laminate 11. Discrete fibers 25, also referred to herein as "Z-direction fibers," are preferably S-glass fiberglass fibers in lengths of about 0.25 inches. It will be appreciated that other fiber material, such as polymer-based or graphite-based fibers, may be used to form mat 23, and that in some applications, it may be desirable to use more than one type of discrete fiber 25 or discrete fiber 25 of different lengths.

Discrete fibers 25 are pulled into and through preform 11 by one or more barbed needles 27 having flush barbs 29, as will be explained in more detail below. As needles 27 pass through mat 23 of discrete fibers 25, barbs 29 catch and fill up with discrete fibers 25. As needles 27 push through layers 13, 15, and 17 of preform 11, discrete fibers 25 are pulled through preform 11 by barbs 29. As needles 27 retract back through preform 11, discrete fibers 25 are released by barbs 29 and left in preform 11 in the Z direction, as indicated by "pulled" Z-direction fibers 31. In the preferred embodiment, needles 27 are pushed far enough through preform 11 so that barbs 29 pass through preform 11 leaving exposed loops 33 in Z-direction fibers 31 when needles 27 are retracted back through preform 11. To ensure that barbs 29 completely fill with discrete fibers 25 and do not catch, break, deform, or pull composite fibers 21, mat 23 is preferably about 0.375 inches thick in the Z direction.

Figure 2A:
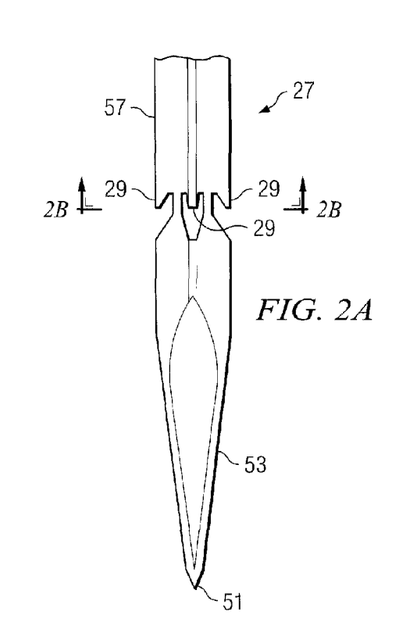
FIG. 2A is a partial perspective view of a barbed needle according to the present invention.
Figure 2B:
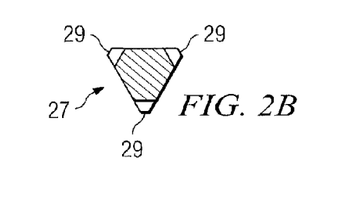
FIG. 2B is a cross-sectional view of the barbed needle of FIG. 2A taken at A-A.

Referring now to FIGS. 2A and 2B in the drawings, one needle 27 is illustrated in a partial perspective view and a cross-sectional view. Needles 27 are preferably crown needles having a point 51, a tapered tip 53, a plurality of barbs 29, an abbreviated tapered blade 57, and an attachment portion (not shown) that is adapted for attachment to a needle bank 81 (see FIG. 3). Needles 27 are preferably made of steel or other suitable material. The number, style, spacing, and location of barbs 29 is selectively chosen to ensure that a sufficient volume of discrete fibers 25 are caught and pulled through preform 11, and that the disruption to composite fibers 21 is minimized. Needles 27 have at least one portion along their length having a polygonal or elliptical cross-sectional area, with barbs 29 being coplanar and disposed at one or more of the corners of the polygonal or elliptical cross-sectional area. In the preferred embodiment, each needle 27 is triangular in cross-section at the portion in which barbs 29 are located, and includes a single plane of flush barbs 29. Barbs 29 are equally spaced apart and located at the corners of the triangular cross-section, as shown in FIG. 2B.

Referring now to FIGS. 3-9B in the drawings, one embodiment of a tool 71 for carrying out the present invention on small preforms is illustrated. It will be appreciated that tool 71 is merely a simplified representation of one mechanical configuration of a tool for carrying out the present invention.

Figure 3:
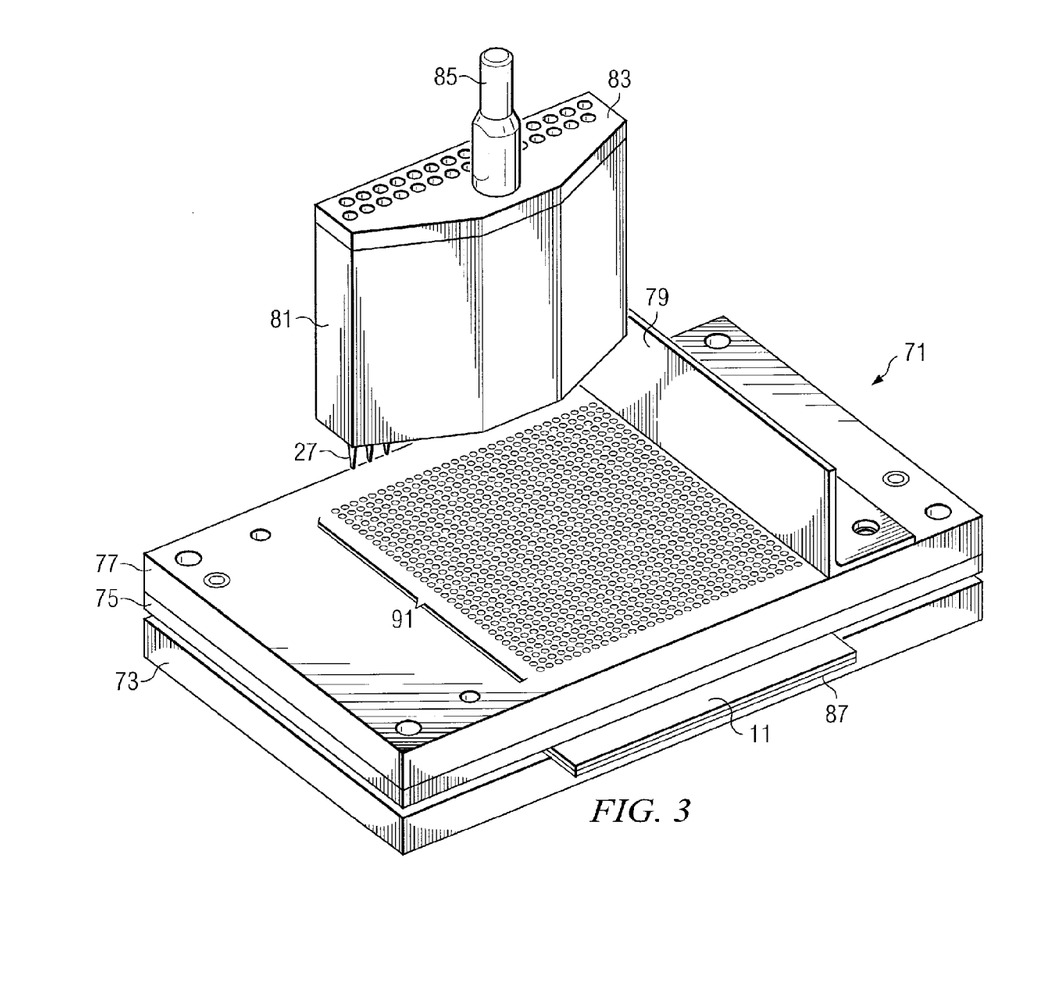
FIG. 3 is a perspective view of one embodiment of a simplified tool for carrying out the present invention.
Figure 4A:
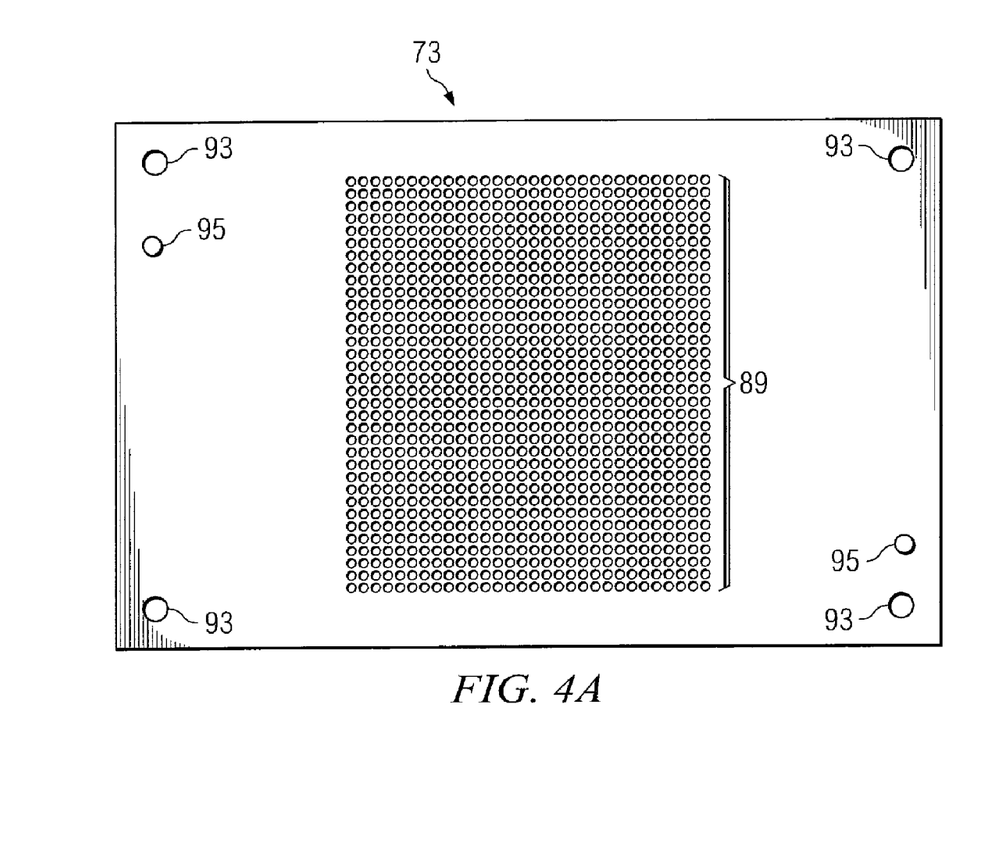
FIG. 4A is a top view of the base plate of the tool of FIG. 3.
Figure 4B:
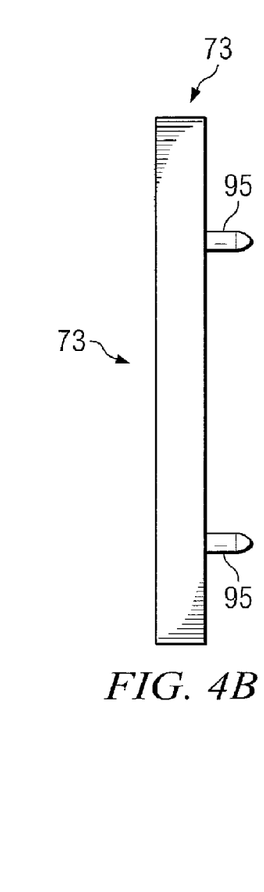
FIG. 4B is a left side view of the base plate of FIG. 4A.

As shown in FIGS. 3 and 4, tool 71 includes a base plate 73, a middle fiber retaining plate 75, a top plate 77, an optional guide rail 79, a needle bank 81 having a needle retention plate 83, a coupling member 85, and a reciprocating device (not shown). When assembled, preform 11 is sandwiched between base plate 73 and fiber retaining plate 75. Base plate 73 and top plate 77 include a plurality of aligned needle apertures 89 and 91, respectively. Needle apertures 89 and 91 are sized and spaced apart to accommodate needles 27 of needle bank 81, and to provide sufficient space to ensure that discrete fibers 25 are not pulled by more than one needle 27. Needle apertures 91 are slightly countersunk to ensure smooth transition of needles 27 of needle bank 81 through the base plate 73. Base plate 73, fiber retaining plate 75, and top plate 77 are preferably made of aluminum or other metallic material. However, it should be understood that base plate 73, fiber retaining plate 75, and top plate 77 may be formed from soft, pliable materials, such as foam, rubber, nylon, or any other suitable material. If alternate materials such as these are used, needle 27 may be able to easily penetrate preform 11 without the presence of needle apertures 91 in top plate 77 or needle apertures 89 in base plate 73.

A layer of resilient material 87, such a silicon rubber, may be associated with preform 11 during various steps of the present invention. Resilient material 87 may be temporarily affixed to preform 11. When used during the fiber insertion process, resilient material 87 is sandwiched between base plate 73 and fiber retaining plate 75 along with preform 11. In an alternate embodiment, resilient material 87 may be embedded in a tooling fixture to facilitate fiber insertion after "tackified" perform is formed and compressed to the final part contours on the tooling surface. Resilient material provides support for exposed loops 33. Additional functions of resilient material 87 are discussed below.

In an alternate embodiment, resilient material 87 may comprise, or may be replaced with, a thermoplastic material that wicks into Z-direction loops 33 and any loose ends of discrete fibers 31 that protrude through preform 11. This prevents the resin in any resin transfer operation from wicking into exposed Z-direction loops 33 and may be removed chemically or melted away from the cured fiber inserted preform. In another alternate embodiment, resilient material 87 comprises a soluble washout material, such as a soluble ceramic based coating similar to Cercon®, that prevents the resin from infusing into exposed Z-direction loops 33 and any loose ends of discrete fibers 25 that protrude through preform 11, but which may be removed from preform 11 after the curing process. These embodiments are particularly useful in applications in which the techniques of the present invention are used to bond one or more preforms together. These embodiments are discussed in more detail below with respect to FIGS. 13-14C.

Base plate 73 is shown in FIGS. 4A and 4B. Base plate 73 includes a plurality of apertures 93 for connecting base plate 73 to fiber retaining plate 75 and top plate 77. In addition, base plate 73 includes at least two locating pins 95 that protrude upward through fiber retaining plate 75 and through top plate 77. Locating pins 95 allow for the proper alignment of the base plate needle apertures 89 and the top plate needle apertures 91, and in conjunction with the slotted holes 97 and 99 of the fiber retaining plate 75 allow for offset movement of fiber retaining plate 75, preform 11, and resilient material 87. This offset movement, which is preferably at about 45° relative to the base plate 73, allows preform 11 to be repositioned and fiber inserted multiple times, resulting in a higher density of Z-direction fibers than is possible with a single pass of needle bank 81.

Figure 5A:
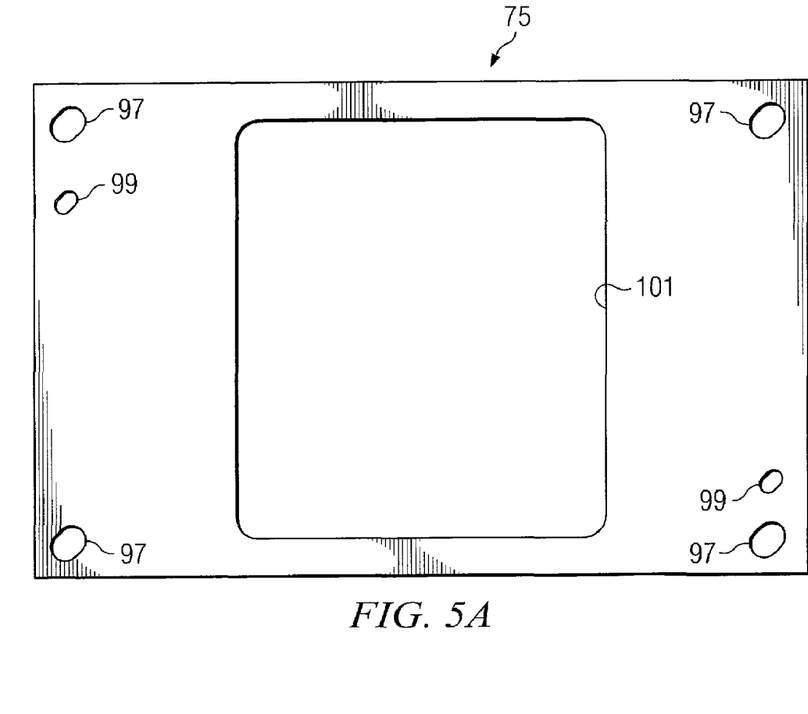
FIG. 5A is a top view of the fiber retaining plate of the tool of FIG. 3.
Figure 5B:
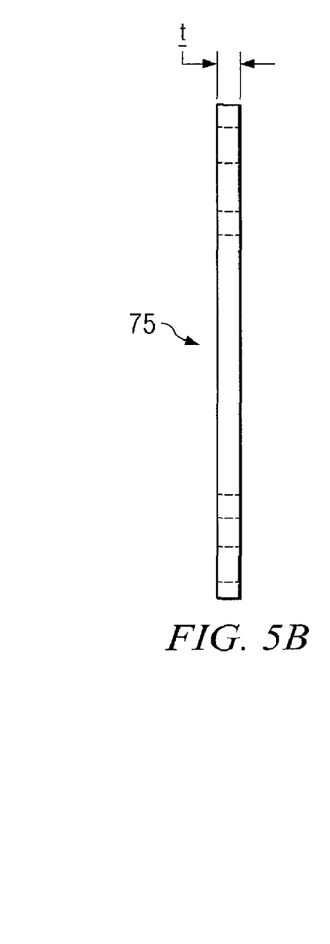
FIG. 5B is a left side view of the fiber retaining plate of FIG. 5A.
Figures 6A, 6B, 6C:
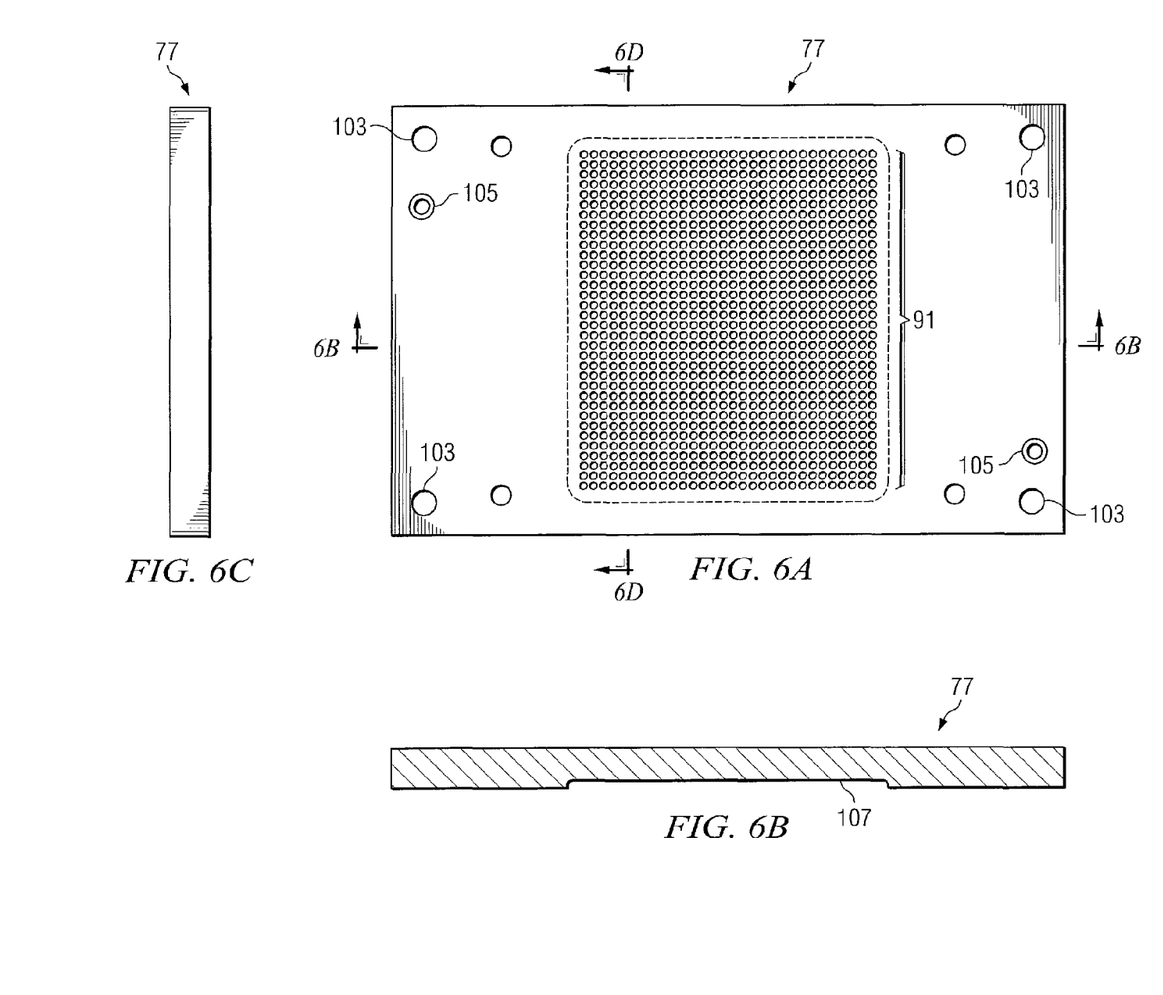
FIG. 6A is a top view of the top plate of the tool of FIG. 3.
FIG. 6B is a cross-sectional view of the top plate of FIG. 6A taken at B-B.
FIG. 6C is a left side view of the top plate of FIG. 6A.
Figure 6D:
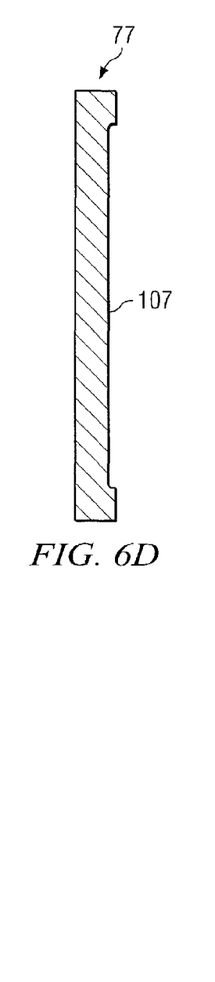
FIG. 6D is a cross-sectional view of the top plate of FIG. 6A taken at C-C.

Fiber retaining plate 75 is shown in FIGS. 5A and 5B. Fiber retaining plate 75 includes a plurality of apertures 97 for connecting fiber retaining plate 75 to base plate 73 and top plate 77. Fiber retaining plate 75 includes guide slots 97 and 99 for receiving locating pins 95. Guide slots 97 and 99 allow fiber retaining plate 75, preform 11, and resilient material 87 to be translated and repositioned relative to base plate 73. This repositioning allows for multiple passes with needle bank 81. In addition, fiber retaining plate includes a central fiber retaining aperture 101 that is shaped to align with and surround needle apertures 89 and 91 in base plate 73 and top plate 77. Discrete fibers 25 are loaded into and retained within fiber retaining aperture 101. As such, fiber retaining plate 75 has a thickness t that is sized to produce a selected volume of void space within fiber retaining aperture 101 for retaining discrete fibers 25. It is important that a sufficient volume of discrete fibers 25 be supplied for each fiber insertion pass and that the front side of the perform be clear of bound or clumped discrete fibers before each fiber insertion pass so that barbs 29 catch and fill completely up with discrete fibers 25. This ensures that barbs 29 will not catch and break composite fibers 21 as needles 27 pass through preform 11.

Top plate 77 is shown in FIGS. 6A-6D. Top plate 77 includes a plurality of apertures 103 for connecting top plate 77 to base plate 73 and fiber retaining plate 75. Top plate 77 includes optional apertures 105 for receiving locating pins 95. Top plate 77 includes an optional recessed portion 107 through which pass needle apertures 91. Recessed portion 107 provides additional volume for discrete fibers 25.

Figure 7A:
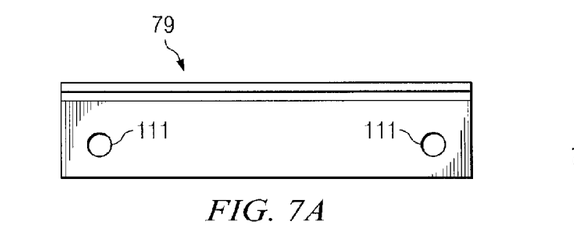
FIG. 7A is a top view of the optional guide rail of the tool of FIG. 3.
Figure 7B:
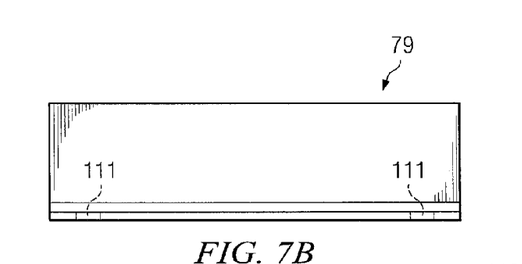
FIG. 7B is a front view of the optional guide rail of FIG. 7A.
Figure 7C:
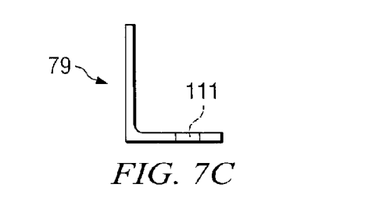
FIG. 7C is a left side view of the optional guide rail of FIG. 7A.

Guide rail 79 is shown in FIGS. 7A-7C. Guide rail 79 is optional and provides a means of guiding and stabilizing needle bank 81 as needle bank 81 reciprocates. Guide rail 79 includes mounting apertures 111 for connecting guide rail 79 to top plate 77. It will be appreciated that additional guide rails 77 may be utilized to guide and stabilize the needle bank 81.

Figures 8A, 8B:
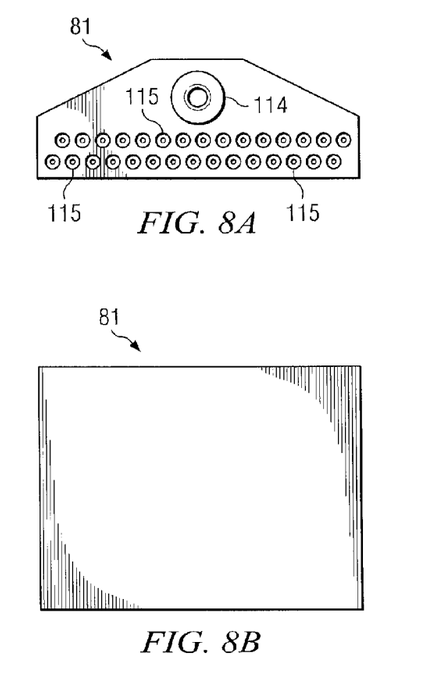
FIG. 8A is a top view of the needle bank of the tool of FIG. 3.
FIG. 8B is a front view of the needle bank of FIG. 8A.

Needle bank 81 is shown in FIGS. 8A and 8B. For clarity, needle retention plate 83 has been removed. Needle bank 81 includes an internally threaded counterbore 114 for receiving coupling member 85 and a plurality of spaced apart needle receivers 115 for releasably receiving needles 27. Needle receivers 115 are counter-bored to support the needles laterally and can be modified to support a variety of needle lengths. Needle receivers 115, and thus needles 27, are selectively spaced apart to ensure that a maximum number and volume of discrete fibers are introduced into preform 11 with each stoke of each needle 27. In the preferred embodiment, two offset rows of needle receivers 115 and needles 27 are provided. Because, in the preferred embodiment, the density of needle apertures 89 and 91 in one row of the base plate 73 and top plate 77 is twice as great as the density of one row of needles 27, this configuration allows preform 11 to be needled with the desired spacing grid. Those skilled in the art will appreciate that the density and arrangement of needle receivers 115 and needle apertures 89 and 91 may be configured to produce a wide variety of selected patterns of Z-direction fibers in perform 11.

It is preferred that needles 27 be installed into needle bank 81 such that barbs 29 of needles 27 be coplanar. This configuration ensures that discrete fibers 25 are pulled through preform 11 simultaneously and that exposed Z-fiber loops 33 are of uniform heights. However, it should be understood that in certain applications, particularly applications involving preforms having curved contours or variable thicknesses, it may be desirable to vary the position, stroke, or penetration force of one or needles 27 in needle bank 81. Thus, needle bank 81 may include a spring biasing mechanism (not shown) for varying the penetration force exerted by needles 27 on preform 11.

Figure 9A:
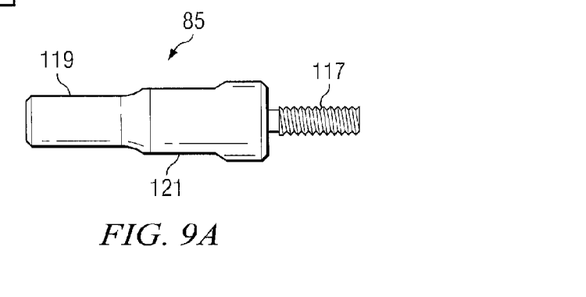
FIG. 9A is a top view of the coupling member of the tool of FIG. 3.
Figure 9B:
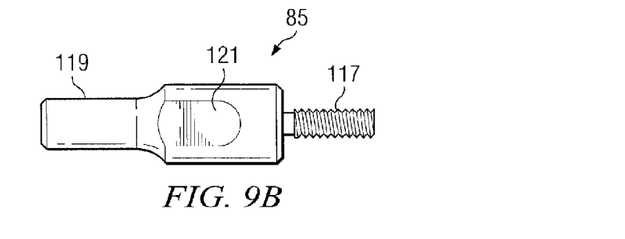
FIG. 9B is a front view of the coupling member of FIG. 9A.
Figure 9C:
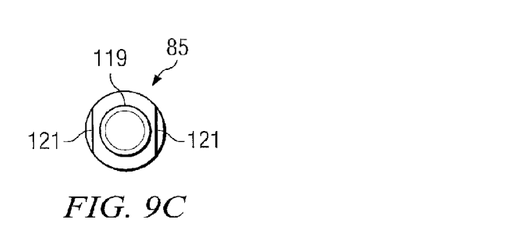
FIG. 9c is a left side view of the coupling member of FIG. 9A.

Coupling member 85 is shown in FIGS. 9A-9C. Coupling member 85 provides a means for attaching needle bank 81 to the reciprocating device. Coupling member 85 includes a threaded shaft 117 at one end for installation into counterbore 114 of needle bank 81, and a mounting shaft 119 adapted for connection to the reciprocating device. Mounting shaft 119 may include wrench flats 121 to facilitate installation of threaded shaft 117 into counterbore 114.

In operation, base plate 73 is set upon a support structure (not shown). Needles 27 are loaded into needle bank 81 and selectively positioned. Then, preform 11 and resilient material 87 are laid down and positioned over base plate 73. Next, fiber retaining plate 75 is placed over resilient material 87 and preform 11. Then, a volume of discrete fibers 25 is loaded into fiber retaining aperture 101. Top plate 77 is then positioned over fiber retaining plate 75. Next, base plate 73, fiber retaining plate 75, and top plate 77 are fastened or clamped securely together, thereby sandwiching preform 11 and resilient material 87 between base plate 73 and fiber retaining plate 75. Next, the reciprocating device is initiated, causing needles 27 to penetrate through preform 11 and resilient material 87.

As needles 27 penetrate through preform 11 and resilient material 87, barbs 29 pull discrete fibers 25 through preform 11 and into resilient material 87. As needles 27 retract back through resilient material 87 and preform 11, resilient material 87 squeezes Z-direction loops 33 and any loose ends of discrete fibers 25 protruding through preform 11 and prevents them from passing back through preform 11. It is preferred that mat 23 of discrete fibers 25 be brushed and replenished between each needling pass, as mat 23 may become compacted by the initial fiber insertion pass.

Figure 10A:
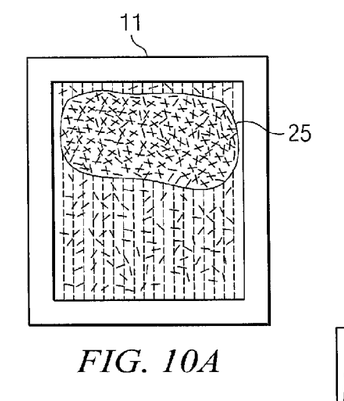
FIG. 10A is a top view of a preform after the fiber insertion process of the present invention.
Figure 10B:
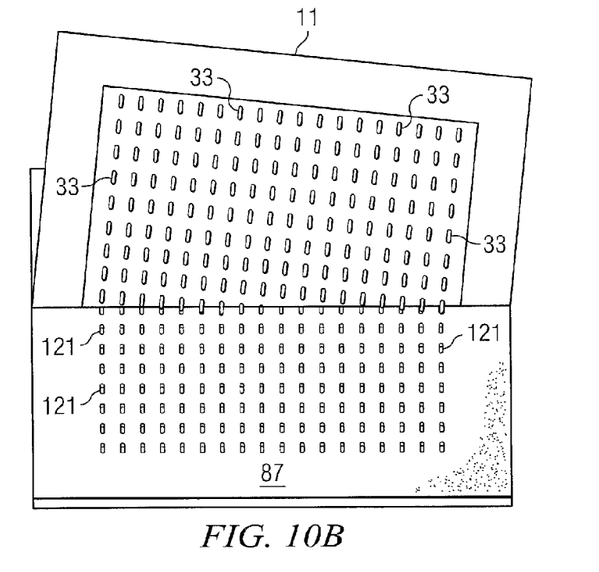
FIG. 10B is a bottom view of a preform and a resilient material after the fiber insertion process of the present invention.

Referring now to FIGS. 10A and 10B in the drawings, preform 11 is shown after the fiber insertion process. In FIG. 10A, the top side of preform 11 is shown after the fiber insertion process. Some unused discrete fibers 25 may remain loose, and some may become compacted. Resilient material 87 aids in holding Z-direction loops 33 in preform 11 as loose discrete fibers 25 are removed. In FIG. 10B, the lower side of preform 11 and resilient material 87 is shown after the fiber insertion process. In this view, resilient material 87 has been peeled back from preform 11 to inspect Z-direction loops 33 protruding outward from preform 11, and puncture marks 121 in resilient material 87. This step is done to verify that exposed loops 33 are embedded sufficiently in resilient material 87 and is not a normal part of the procedure.

Figure 11A:
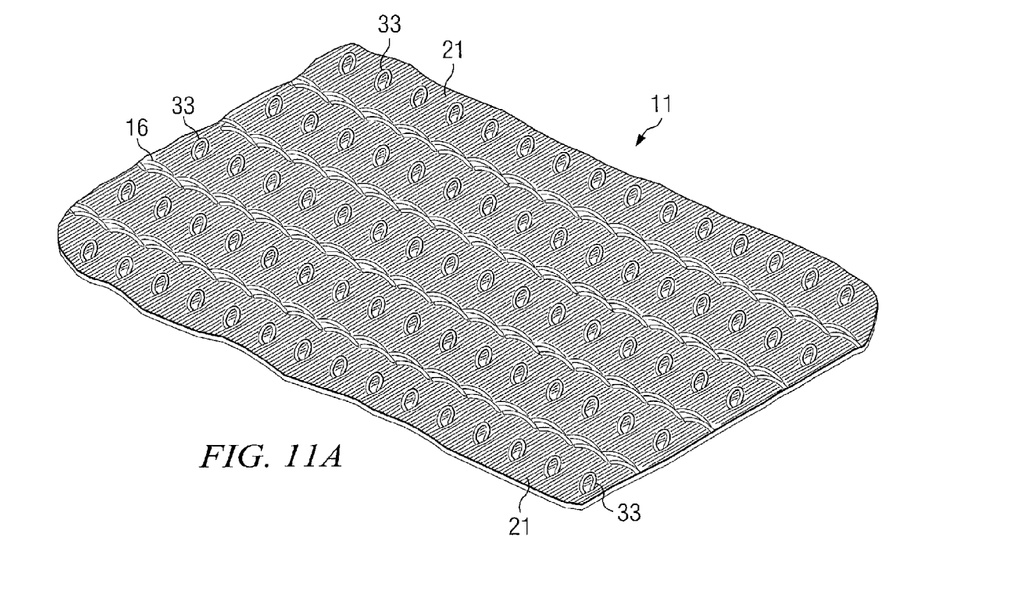
FIGS. 11A-11C are close-up views of the preform of FIGS. 10A and 10B after the fiber insertion process of the present invention.
Figure 11B:
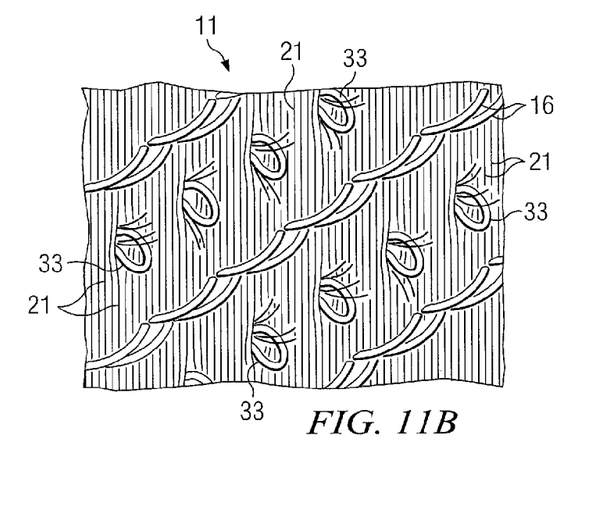
Figure 11C:
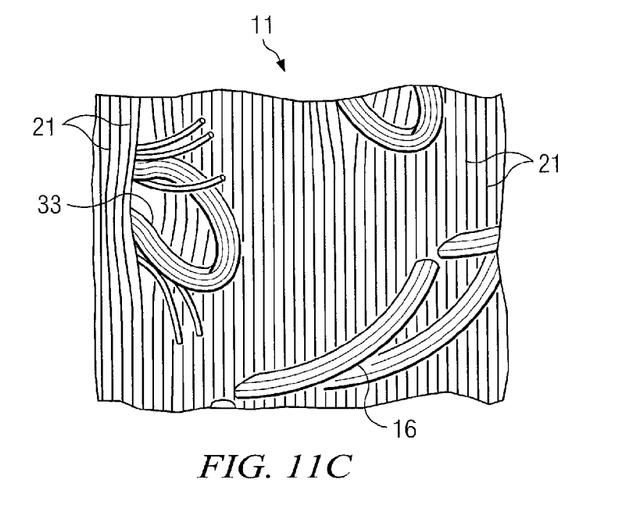

Referring now to FIGS. 11A-11C in the drawings, close-up views of preform 11 are illustrated. As is shown, discrete fibers 25 have been pulled through preform 11 to form definitive, uniform Z-direction loops 33 and loose ends of discrete fibers 31 that protrude through preform 11. Because barbs 29 of needles 27 were full of discrete fibers 25 as needles 27 passed through preform 11, graphite fibers 21 are not broken, pulled, or looped.

Figure 12A:
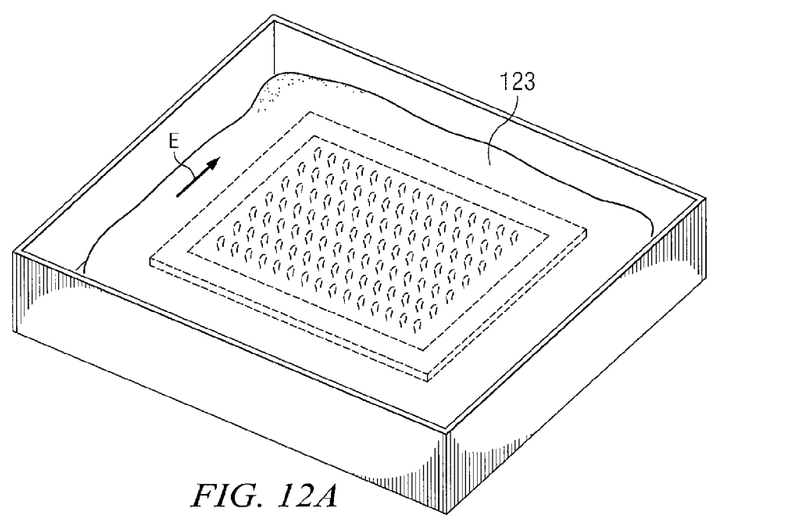
FIG. 12A is a view of a Z-direction reinforced preform according to the present invention undergoing a vacuum assisted resin transfer molding process.
Figure 12B:
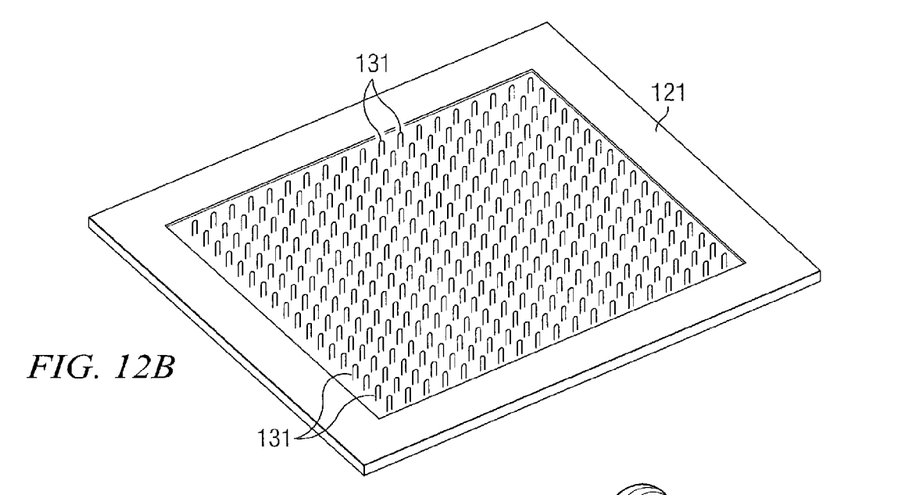
FIGS. 12B-12D are views of a cured Z-direction reinforced preform according to the present invention after undergoing a vacuum assisted resin transfer molding process.
Figure 12C:
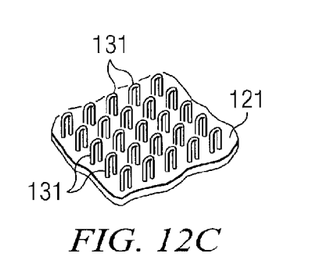
Figure 12D:
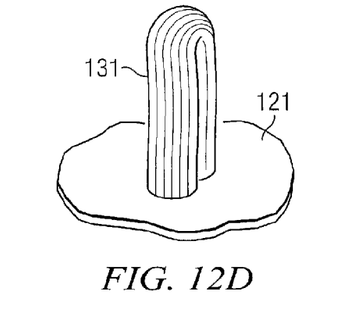

Referring now to FIGS. 12A-12D in the drawings, a Z-direction reinforced preform 121 is illustrated during and after a vacuum assisted resin transfer molding process. In FIG. 12A, preform 121 has been enclosed in a vacuum bag 123 and is undergoing the vacuum assisted resin transfer molding process. As is shown, the resin is being pulled over the performs in the direction indicated by arrow E. In FIG. 12B, the vacuum assisted resin transfer molding process has been completed, and preform 121 has been cured. As is shown, a plurality of Z-direction loop-posts 131 protrude outward from preform 121. FIGS. 12C and 12D are enlarged views of Z-direction loop-posts 131. During the vacuum assisted resin transfer molding process using resilient material 87 of the preferred embodiment, the resin is wicked into Z-direction loops 131. After curing, the resin makes Z-direction loop-posts 131 that rigidly protrude outward from cured preform 121. These rigid Z-direction loop-posts 131 are preferably cleaned of excess resin, preferably with a soft media grit blast, making them useful for reinforcing composite bonded joints.

Figure 13:
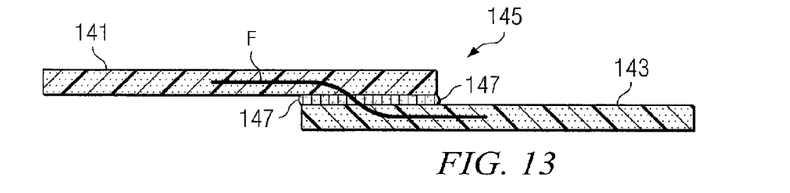
FIG. 13 is a schematic showing two preforms infused together to form a co-cured reinforced joint according to the present invention.
Figure 14A:
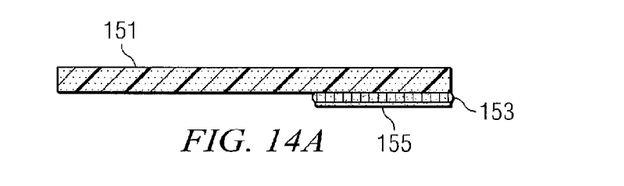
FIGS. 14A-14C are schematics showing two composite parts that have been cured separately and bonded together secondarily according to the present invention.
Figure 14B:
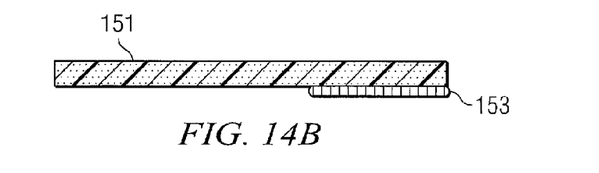
Figure 14C:
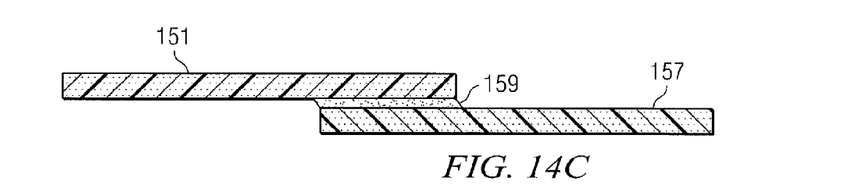
Figure 15:
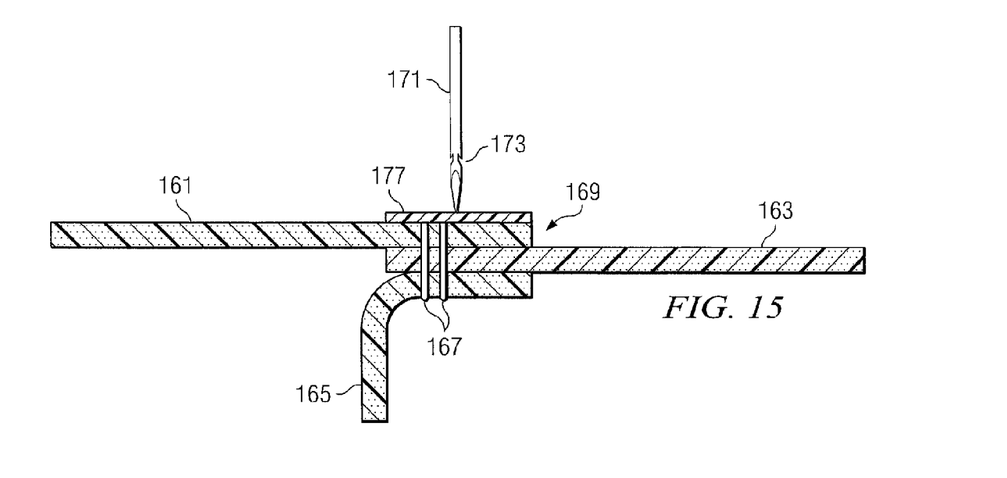
FIG. 15 is a schematic showing how two or more faying dry preforms may be reinforced with Z-direction fibers according to the present invention.

FIGS. 13-15 illustrate some exemplary ways of how the present invention may be used to join and bond composite laminate parts together. In FIG. 13, two preforms 141 and 143 are infused together to form a co-cured reinforced joint 145. In this example, each part 141 and 143 includes exposed Z-direction reinforcement fibers 147. The parts are placed together so that Z-direction fibers co-mingle, and then resin is infused through both parts 141 and 143. A resin infusion path is shown as curve F. Once the resin has been infused through both parts 141 and 143, parts 141 and 143 are cured together, thereby forming a co-cured composite Z-fiber reinforced joint or forming the constituents of separate prepreg details. Resilient material 87 is not required for this embodiment.

FIGS. 14A-14C illustrate an exemplary way of how the present invention may be used to bond two cured composite parts together. As shown in FIG. 14A, a cured composite part 151 has Z-direction fibers 153 that have been shielded from the resin by a soluble washout or thermoplastic material 155 or cleaned of resin after removal of resilient material 87. In FIG. 14B, excess resin, soluble washout or thermoplastic material 155 has been removed to expose Z-direction fibers 153. FIGS. 14A and 14B represent a bonding preparation step. In FIG. 14C, part 151 has been bonded to a second composite part 157 with an adhesive material 159. Second composite part 157 has preferably been prepared in the same manner as part 151.

FIG. 15 illustrates an exemplary way of how the present invention may be used to reinforce multiple dry composite preforms at a bonded joint interface by inserting Z-direction fibers through the preforms according to the present invention. In this example, three preforms 161, 163, and 165 are reinforced by inserting Z-direction fibers 167 through all three preforms 161, 163, and 165 in an area 169 where all three preforms 161, 163, and 165 overlap. In accordance with the present invention, Z-direction fibers 167 are formed by pushing a needle 171 having barbs 173 through a mat 175 of randomly dispersed discrete fibers 177. The fiber inserted preforms 161, 163, and 165 may then be co-cured or infused with resin and used as separate prepreg details. Resilient material 87 is not required for this embodiment.

It should be understood that it is not necessary that Z-direction loops 33 and 131 created by the techniques of the present invention be used solely for bonding multiple parts together. When left exposed, Z-direction loops 33 and 131 may serve as a means for transferring heat from the composite part. This is particularly true when discrete fibers 25 are chosen from a group of materials having good heat conductivity properties.

Figure 16A:
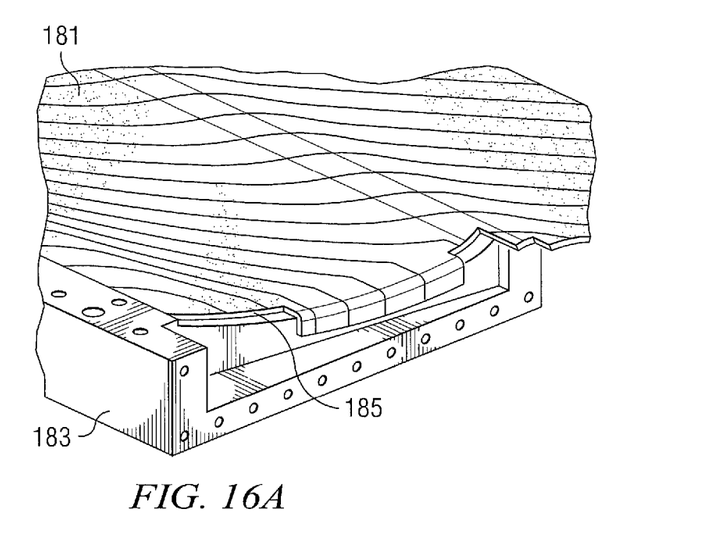
FIGS. 16A and 16B are applications for which the Z-direction reinforced composite preforms according to the present invention are particularly well suited
Figure 16B:
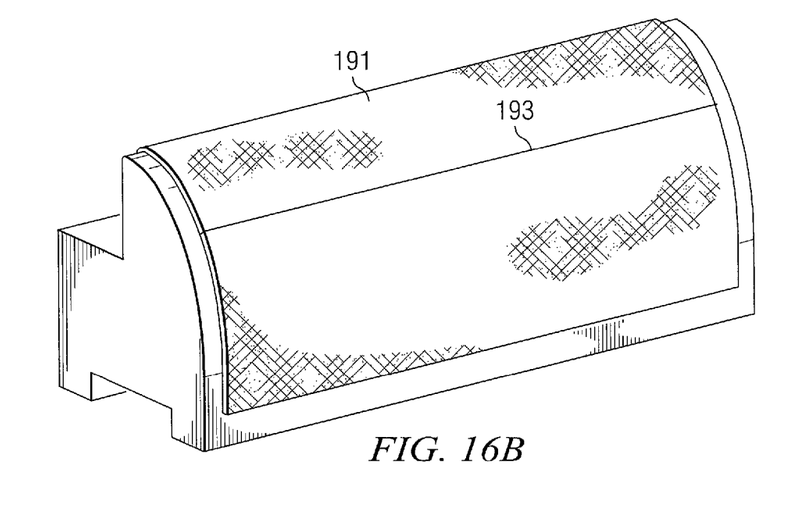

Referring now to FIGS. 16A and 16B in the drawings, applications for which the Z-direction reinforced composite preforms according to the present invention are particularly well suited are illustrated. In FIG. 16A, a stack of prepreg lamina 181 has been laid up in a mold 183. As is shown, stack 181 forms a relatively thick end section 185. Proper transitioning of this buildup to the baseline thickness must be done by conventional staggered ply drop or tapering methods. Although these conventional methods provide good strength properties, they are typically performed manually. Thus, they are very labor intensive and expensive. On the other hand, the Z-direction reinforcement techniques of the present invention eliminate the need for complicated conventional methods. By using the Z-direction reinforcement method of the present invention, comparable strength properties can be achieved at greatly reduced costs without dropping of the initial end build up.

In FIG. 16B, another example of the cost saving benefits of the present invention is illustrated. Often, for a large contoured skin 191, it is convenient to form complex curvatures using two or more large preform blankets. This leaves a long seam 193 running along the length of the part. Such a long seam in a perform blanket configuration is undesirable because of the large drop-off from one blanket to the next. However, with the present invention, seam 193 may have Z-direction reinforcement fibers inserted according to the present invention. This allows single preform blankets to be joined together to form the contoured part.

It is apparent that an invention with significant advantages has been described and illustrated. Although the present invention is shown in a limited number of forms, it is not limited to just these forms, but is amenable to various changes and modifications without departing from the spirit thereof.

What is claimed is:

1. An apparatus for reinforcing in a Z direction a composite preform having composite fibers in an X-Y direction comprising:
   a base plate having a lower array of needle apertures;
   a middle plate disposed above the base plate, the middle plate having an aperture for retaining a volume of discrete fibers, the base plate and the middle plate being adapted to receive the preform therebetween;
   a top plate disposed above the middle plate, the top plate having an upper array of needle apertures;
   a needle bank for holding a plurality of barbed needles; and
   a reciprocating device for repeatedly pushing the needles through the upper array of needle apertures, the volume of discrete fibers, and the lower array of needle apertures;
   wherein the discrete fibers are inserted through the preform generally in the Z direction so as to provide reinforcement in the Z direction.

2. The apparatus according to claim 1, wherein the discrete fibers are fiberglass.

3. The apparatus according to claim 2, wherein the fiberglass discrete fibers are S-glass discrete fibers.

4. The apparatus according to claim 1, wherein the discrete fibers are graphite.

5. The apparatus according to claim 1, wherein the discrete fibers are polymers.

6. The apparatus according to claim 1, further comprising:
   a resilient material disposed between the base plate and the middle plate for providing support for the preform and for retaining the discrete fibers after the discrete fibers have been pushed through the preform.

7. The apparatus according to claim 1, further comprising a soluble material disposed between the base plate and the middle plate for providing support for the preform and for retaining the discrete fibers after the discrete fibers have been pushed through the preform.

8. The apparatus according to claim 1, further comprising a meltable material disposed between the base plate and the middle plate for providing support for the preform and for retaining the discrete fibers after the discrete fibers have been pushed through the preform.

9. The apparatus according to claim 8, wherein the meltable material is thermoplastic.

10. The apparatus according to claim 1, further comprising:
    at least one guide rail for guiding and stabilizing the reciprocating device.

* * * * *